United States Patent [19]

Wurmb et al.

[11] 4,048,135

[45] Sept. 13, 1977

[54] POLYESTER MOLDING COMPOSITIONS OF REDUCED FLAMMABILITY

[75] Inventors: Rolf Wurmb, Heidelberg; Bernd Leutner; Wolfgang Seydl, both of Frankenthal; Hans-Ulrich Schlimper, Speyer; Hans-Josef Sterzel, Dannstadt-Schauernheim, all of Germany

[73] Assignee: BASF Aktiengesellschaft, Ludwigshafen, Germany

[21] Appl. No.: 665,062

[22] Filed: Mar. 8, 1976

[30] Foreign Application Priority Data

Mar. 21, 1975 Germany .............................. 2512504

[51] Int. Cl.$^2$ .......................... C08K 3/40; C08K 3/34; C08K 5/03
[52] U.S. Cl. ............. 260/40 R; 260/45.75 B; 260/45.7 R
[58] Field of Search .......... 260/40 R, 45.75 B, 45.7 R

[56] References Cited

U.S. PATENT DOCUMENTS

| 3,741,893 | 6/1973 | Mascioli et al. ............... 260/45.75 B |
| 3,764,576 | 10/1973 | Russo ................................. 260/40 R |
| 3,810,864 | 5/1974 | White et al. ...................... 260/42.49 |
| 3,859,246 | 1/1975 | Jackson et al. ................... 260/40 R |
| 3,947,421 | 3/1976 | Seydl ............................. 260/45.75 B |

*Primary Examiner*—V.P. Hoke
*Attorney, Agent, or Firm*—Keil, Thompson & Shurtleff

[57] ABSTRACT

Thermoplastic, linear, saturated polyesters containing flameproofing agents consisting of halogen compounds and an antimony trioxide which has been prepared in an aqueous suspension of an inorganic support using an aqueous antimony(III) halide solution and adding an aqueous solution of a base to raise the pH to from 6 to 8 with precipitation of the antimony compound onto the support, followed by separation of the solids from the aqueous phase.

6 Claims, No Drawings

POLYESTER MOLDING COMPOSITIONS OF REDUCED FLAMMABILITY

This invention relates to polyester molding compositions containing halogenous flameproofing agents and antimony trioxide to reduce flammability.

It is well known that the mechanical properties, particularly the rigidity, of polyester molding compositions may be improved by the addition of glass fibers. Such additions, however, increase the flammability of the molding compositions. For this reason, a variety of flameproofing agents, particularly those based on halogen or phosphorus compounds, have been added to glass-fiber-reinforced poly-ester molding compositions. Although this reduces the flammability of the plastics material, contact thereof with an open flame will cause a melt of relatively low viscosity to form, which means that burning material can drip from the composition and ignite flammable material present below. This release of burning drops of material is particularly evident on relatively thin shaped articles of glass-fiber-reinforced polyester molding compositions. To avoid this phenomenon, German Published Application 2,158,432 recommends that an aromatic halide as flameproofing agent and long-fiber reinforcing fillers, preferably asbestos, should be added. However, asbestos fibers have the serious drawback that they involve toxicological hazards. According to German Published Application 2,242,509, the release of buring drops is prevented by the addition of finely divided colloidal silicon dioxide. This substance, however, is very voluminous on account of its low bulk density and therefore difficult to meter for incorporation into molten polyester using conventional processing machines.

When halogenous flameproofing agents are used, particularly organic halogen compounds, it is generally necessary for antimony trioxide to be used as synergist, the amount necessary being from 2 to 10% by weight. However, in order to obtain formulations which show no dripping tendencies, it is necessary to use at least 4 to 8% by weight of antimony trioxide. The use of antimony trioxide in such amounts is uneconomical on account of its price and is known to have a degrading effect on linear polyesters. In addition, an unduly high content of foreign substance reduces the mechanical strength.

It is an object of the invention to obviate the drawbacks of the prior art.

This object is achieved by thermoplastic molding compositions consisting of

A. a linear saturated polyester,
B. from 6 to 30% by weight, based on the total weight of the molding composition, of a flameproofing additive comprising halogen compounds and antimony trioxide, and, optionally,
C. from 5 to 60% by weight, based on the total weight of the molding composition, of reinforcing fillers, said antimony trioxide having been prepared in an aqueous suspension of an inorganic support by precipitation onto said support from an aqueous antimony (III) halide solution by the addition of an aqueous solution of a base to increase the pH to from 6 to 8, followed by separation from the aqueous phase.

The antimony trioxide contained in the molding compositions of the invention, to which no claim is made herein, may be obtained by adding the antimony (III) salt to the aqueous suspension of the inorganic support and then neutralizing. Alternatively, particularly where supports are used which are not stable under acid conditions, the antimony (III) salt solution and the aqueous solution of the base may be added simultaneously to maintain a pH of from 6 to 8 in the reaction mixture.

The inorganic supports used may include any inorganic substance which is water-soluble and is compatible with the polyesters with which they are to be mixed. The supports should preferably not be too hard and abrasive so as not to damage the processing equipment during processing with the polyesters. Advantageously, they have a Mohs hardness of from 1 to 8 and preferably of from 1 to 6.

Suitable supports are silicic acid and silicates such as leaf silicates, e.g. kaolin and talc, and also aluminum oxide and aluminum hydroxides, particulate amorphous or crystalline silicon dioxide, titanium dioxide and calcium carbonate. The supports are conveniently used in particle sizes of from 0.1 to 100 $\mu$m and preferably from 1 to 20 $\mu$m.

The concentration of the supporting material in the suspension depends, inter alia, on the type of support used, since for example leaf silicates such as kaolin and talc swell and thus make only low concentrations possible. In general, the concentration of the suspension is at least 1.5% by weight.

The antimony (III) halide solutions are usually employed in the form of 1M to 3M solutions. It is also advantageous to add up to 1 mole of sodium halide per mole of antimony (III) halide and/or the corresponding amount of hydrogen halide, since this favors the hydrolysis of the antimony (III) halide.

Where ammonia solutions are used as base, concentrations of from 10 to 33% by weight are suitable, and in the case of caustic alkali metal solutions, e.g. caustic soda or caustic potash, concentrations of from 10 to 50% by weight are suitable.

The ensure that precipitation is as complete as possible, the reaction rate should not be too high. For this reason, it is advantageous to effect neutralization by adding not more than 0.36n moles of a base having a valency of n per liter of suspension of the support per minute.

Advantageously, the reaction mixture is allowed to react for from 10 to 60 minutes after the addition of all of the reactants, before the solids are separated from the solution. The pH may fall during this post-reaction period, in which case it must be readjusted to the desired value of from 6 to 8 before isolation of the solids.

The reaction may be carried out at room temperature (20° C) or at elevated temperatures. It is advantageous to carry out the reaction at temperatures of from 30° to 80° C.

The antimony trihalide is used in amounts relative to the inorganic support such that the filler finally has an antimony (III) oxide content of from 30 to 60% by weight.

The use, according to the present invention, of antimony trioxide obtained in the above manner means that the amount of antimony oxide required is at most half of that required in the prior art.

The concentration of $Sb_2O_3$-enveloped fillers in the compositions of the invention is from 2 to 15% and preferably from 4 to 10%, by weight.

The preferred linear saturated polyester to be used in the invention is polybutylene terephthalate, although the additives are similarly effective with polyethylene terephthalate and polypropylene terephthalate. The polybutylene terephthalate should be substantailly composed of terephthalic acid and 1,4-butanediol, although up to 15% molar of the terephthalic acid may be replaced by other dicarboxylic acids such as isophthalic, naphthalenedioic, adipic and sebacic acids, and up to 15% of the butanediol may be replaced by other glycols such as ethylene glycol, propylene glycol and neopentyl glycol. The K values of the polyesters (measured by the method proposed by H. Fikentscher in Cellulosechemie 13, 1932, p. 58, at 25° C on a solution having a concentration of 0.5 g per 100 ml of a mixture of phenol and o-dichlorobenzene) should preferably be from 55 to 80 and in particular from 60 to 75.

The glass fibers used for reinforcing the compositions may be in the form of chopped strands or of rovings. They may be pretreated with conventional sizes and adhesion promoters based on organosilanes such as glycidoxypropyl triethoxysilane. The average length of the glass fibers in the mixture should preferably be from 0.05 to 1 mm and more preferably from 0.10 to 0.4 mm. They are used in amounts of from 10 to 60% and preferably from 10 to 35%, by weight of the molding composition. The glass fibers are preferably of so-called E-glass, although fibers of A-glass or C-glass are also suitable. Alternatively, other reinforcing fibers and fillers may be used in the present invention, if desired, for example carbon fibers, asbestos fibers, potassium titanate fibers, glass spheres and polytetrachloroethylene resins having particle sizes of from 0.2 to 0.8 mm.

Suitable flameproofing agents are halogenous compounds, particularly organic halogenous compounds which are thermally stable at the processing temperatures of the polyesters. Specific examples are halogenated aromatic compounds such as pentabromotoluene, hexabromobiphenyl, decabromobiphenyl, decabromobiphenyl ether, and bromine-containing aromatic compounds such as are obtained in the reaction of tetrabromobisphenol-A and epichlorohydrin. Also particularly suitable are the adducts obtained by reacting hexachlorocyclopentadiene with dienes such as cyclooctadiene. Their concentration is from 4 to 20% and preferably from 6 to 15%, by weight.

In addition to the above additives, the molding compositions of the invention may contain conventional stabilizers, processing auxiliaries, lubricants, dyes and pigments. Incorporation of the additives into the polyester material may be carried out using conventional machines such as extruders, rollers and kneaders. It is sometimes advantageous to premix the additives or to form a masterbatch of the additive in small amounts of the polyester and then to mix this with the bulk of the polyester.

In the following Examples the parts and percentages are by weight.

EXAMPLE 1

Preparation of fillers 260 cm$^3$ of a 600 g/l solution of antimony (III) chloride solution in hydrochloric acid are mixed with a suspension of 100 g of kaolin in 1.9 liters of water with vigorous stirring. A 19% ammonia solution is then added to the suspension at a rate of 0.205 mole of NH$_3$/minute, equivalent to an addition rate of 0.108 mole of NH$_3$/minute per liter of suspension. To complete hydrolysis, the pH is readjusted after from 5 to 10 minutes and the suspension is then filtered and the solids are washed free of chloride. After drying for 12 hours at 120° C, the solids have the following analytical composition:

support (%): 50.0 ± 2
Sb$_2$O$_3$ (%): 50.0 ± 2
chloride (%): < 0.2

EXAMPLE 2

Preparation of molding compositions

Polybutylene terephthalate having a K-value of 72 is melted in a twin-shaft extruder at temperatures of about 250° C. The glass fibers and other additives are added through a downstream port as described in U.S. Pat. No. 3,304,282. The amounts added are listed in Table 1 below. The mixture is extruded through a die and the extrudate is granulated.

The granules are injection molded to specimens measuring 63.5 × 12.5 × 3.2 mm. The flammability is tested in a manner similar to that described in Underwriter Laboratories method 94, the vertically suspended specimens being flamed for 10 seconds with a Bunsen flame. The burning time and dripping properties are determined on 10 specimens in each case. The results are listed in Table 2 below.

The following fillers, prepared as described in Example 1, were used:

precipitated silicic acid with 50% of Sb$_2$O$_3$: sample A
kaolin with 50% of Sb$_2$O$_3$: sample B
talc with 50% of Sb$_2$O$_3$: sample C.

TABLE 1

1.

8% decabromodiphenyl oxide
8% sample A equivalent to 4% Sb$_2$O$_3$ and 4% precipitated silicic acid
30% glass fibers.

2.

13% adduct of 2 moles hexachlorocyclopentadiene and 1 mole cyclooctadiene
7% Sb$_2$O$_3$
30% glass fibers.

3.

13% halogen compound as used in test 2
8% sample C equivalent ot 4% Sb$_2$O$_3$ and 4% talc
30% glass fibers.

4.

13% halogen compound as used in test 2
8% sample B equivalent to 4% Sb$_2$O$_3$ and 4% kaolin
30% glass fibers.

5.

13% halogen compound as used in test 2
8% sample C equivalent to 4% Sb$_2$O$_3$ and 4% talc.

6.

9% decabromodiphenyl
7% sample B equivalent to 3.5% Sb$_2$O$_3$ and 3.5% kaolin
9% potassium titanate fibers.

7.

9% decabromodiphenyl
6% sample B equivalent to 3% Sb$_2$O$_3$ and 3% kaolin
5% polytetrafluoroethylene resin.

Test 2 is a comparative test.

TABLE 2

Burning properties of the specimens

| Test No. | % of $Sb_2O_3$ | % of filler | burning properties |
| --- | --- | --- | --- |
| 1 | 4 | 4 precipitated silicic acid | extinguishes without dripping |
| 2 | 7 | — | burning drops are released |
| 3 | 4 | 4 talc | extinguishes without dripping |
| 4 | 4 | 4 kaolin | " |
| 5 | 4 | 4 talc | " |
| 6 | 3.5 | 9 potassium titanate fibers | " |
| 7 | 3 | 5 polytetrachloroethylene resin | " |

It may be clearly seen that the compositions of the invention having a constant content of $Sb_2O_3$ exhibit much better burning properties than in the comparative test in which only $Sb_2O_3$ was added. Using the latter method, good burning properties are virtually only obtainable when twice the amount of $Sb_2O_3$ is used.

We claim:

1. Thermoplastic molding composition composed of
A. a linear saturated polyester, and
B. from 6 to 30% by weight, based on the total weight of the molding composition, of a flameproofing additive of an organic halogen compound and antimony trioxide,
said antimony trioxide having been precipitated onto a support from an aqueous antimony (III) halide solution by the addition of an aqueous solution of a base to increase the pH to from 6 to 8, followed by isolation of the solids from the aqueous phase, said support.

2. A molding composition as set forth in claim 1 wherein said support is talc or kaolin.

3. A molding composition as set forth in claim 1 wherein said composition further contains from 10 to 60% by weight, based on the total weight of the molding composition, of reinforcing fillers.

4. A molding composition as set forth in claim 2 wherein said support has a particle size range of from 0.1 to 100 μm.

5. A molding composition as set forth in claim 1 wherein the amount of said support antimony (III) oxide by weight in said composition is from 2 to 15%.

6. A molding composition as set forth in claim 5 wherein said composition has an antimony (III) oxide content of from 30 to 60% by weight relative to the support.

* * * * *

UNITED STATES PATENT AND TRADEMARK OFFICE
CERTIFICATE OF CORRECTION

PATENT NO. : 4,048,135
DATED : September 13, 1977
INVENTOR(S) : Rolf Wurmb et al It is certified that error appears in the above-identified patent and that said Letters Patent are hereby corrected as shown below:

Column 6, line 9, after "support" insert --being a silicate having a leaf structure--.

Signed and Sealed this

Eighth Day of August 1978

[SEAL]

Attest:

RUTH C. MASON
*Attesting Officer*

DONALD W. BANNER
*Commissioner of Patents and Trademarks*